United States Patent [19]
Wojtanowitsch et al.

[11] Patent Number: 5,356,507
[45] Date of Patent: Oct. 18, 1994

[54] LAMINATOR

[75] Inventors: Ladislaus Wojtanowitsch, Aschaffenburg, Fed. Rep. of Germany; Gregor Gehrer, Hallein/Rehhof, Austria; Markus Köll, Matrei, Austria; Alfred Nowak, Klagenfurt, Austria

[73] Assignee: E. I. Du Pont de Nemours and Company, Wilmington, Del.

[21] Appl. No.: 4,350

[22] Filed: Jan. 14, 1993

[30] Foreign Application Priority Data

Jan. 30, 1992 [DE] Fed. Rep. of Germany ....... 4202553

[51] Int. Cl.⁵ .............................................. B32B 31/04
[52] U.S. Cl. ................................... 156/555; 156/582; 156/583.1; 100/93 RP
[58] Field of Search ............ 156/364, 555, 582, 583.1; 100/47, 93 RP, 168

[56] References Cited

U.S. PATENT DOCUMENTS

| | | | |
|---|---|---|---|
| Re. 33,288 | 8/1990 | Obayashi | 156/497 |
| 3,547,730 | 12/1970 | Cohen et al. | 96/35.1 |
| 3,623,933 | 11/1971 | Staats | 156/552 |
| 3,901,758 | 8/1975 | Humphries | 156/499 |
| 4,025,380 | 5/1977 | Bernardo | 156/355 |
| 4,151,900 | 5/1979 | Kirwan | 188/174 |
| 4,243,741 | 1/1981 | Abele et al. | 430/270 |
| 4,346,162 | 8/1982 | Abele | 430/270 |
| 4,356,253 | 10/1982 | Buzzell | 430/291 |
| 4,585,509 | 4/1986 | Obayashi | 156/497 |
| 4,818,330 | 4/1989 | Mosburger | 156/473 |
| 4,892,802 | 1/1990 | Bauer et al. | 430/270 |
| 4,921,776 | 5/1990 | Taylor, Jr. | 430/293 |
| 4,948,704 | 8/1990 | Bauer et al. | 430/291 |
| 4,971,893 | 11/1990 | Taylor, Jr. | 430/293 |
| 5,019,536 | 5/1991 | Taylor, Jr. | 428/220 |
| 5,051,147 | 9/1991 | Anger | 156/355 |

FOREIGN PATENT DOCUMENTS

| | | |
|---|---|---|
| 0243933 | 4/1987 | European Pat. Off. . |
| 0260526 | 3/1988 | European Pat. Off. . |
| 0285039 | 3/1988 | European Pat. Off. . |
| 0360269 | 3/1990 | European Pat. Off. . |
| 2188074 | 9/1987 | United Kingdom . |

*Primary Examiner*—David A. Simmons
*Assistant Examiner*—J. Sells

[57] ABSTRACT

A laminator to laminate a film on a support, sheet-shaped in particular. A fixed roller operates together with an upper pressure roller and a lower pressure roller, which can be placed selectively on the fixed roller by means of a shifting device. In this manner, the laminator has a supply of two different film materials for selective application onto the support as needed.

23 Claims, 3 Drawing Sheets

LAMINATOR

BACKGROUND OF THE INVENTION

1. Field of the Invention

The subject of the invention is a laminator to laminate a film onto a support.

2. Description of Related Art

One laminator has an upper pressure nip formed between a fixed roller and above it, a pressure roller. Into the nip can be fed the support from a feed plate and a film, with a protective cover sheeting removed, from an upper supply roller. By means of a shifting device, the upper pressure roller is switched back and forth from an idle position, in which the upper pressure nip is open, to an operating position, in which the upper pressure nip is closed, and the roller drive is started.

A known example of such a laminator is the "CROMALIN® Laminator 2700". It is used in conjunction with a color proofing system. Exposure of the laminate, which consists of a sheet-shaped support and a light-sensitive film, results in tacky areas, to which, after the cover sheeting is removed, toner adheres. After lamination, the composite is slit on a cutting platform on the outlet side. The rest of the film web remains with its leading edge in the open pressure nip ready for the next lamination.

For four-color printing, a support must be provided successively with four light-sensitive films, which, after exposure, are treated with different toners. It is frequently desirable to apply a protective film to cover the topmost toner layer. For this purpose, a protective film must replace the light-sensitive film in the laminator. This exchange must subsequently be reversed, resulting in considerable time loss and high film waste. The alternative of installing two adjoining laminators requires doubling investment costs and is often not feasible because of space limitations.

U.S. Pat. No. 3,547,730 discloses supports, such as plates, laminated on both sides with a light-sensitive web by passing the layered composite through a pressure nip between two heated rollers. It is thereby possible theoretically to laminate one side by omitting one light-sensitive web. However, each change of material requires re-threading the light-sensitive web into the pressure nip.

SUMMARY OF THE INVENTION

The invention involves the problem of providing a laminator of the type described in the introduction to enable selective coating of a support, particularly sheet-shaped, in a simple manner with two different films.

This problem is solved by the invention in that the fixed roller forms a lower pressure nip with a lower roller. Into the lower pressure nip, alternatively to the upper pressure nip, can be fed the support from a feed plate and a second film, after removal of a protective cover sheeting, from a lower supply roll. By means of a shifting device, the lower pressure roller is switched back and forth from an idle position, in which the lower pressure nip is open, to an operating position in which the lower pressure nip is closed and the roller drive is started in the opposite direction.

This construction allows the user to apply a film selectively onto the top or bottom side of the support. It is necessary to operate only one or the other pressure nip to laminate the support with different film material. Because of the availability of two pressure nips, the film not in use at the moment can remain in the pressure nip so that it is positioned correctly for the next lamination process. Space requirements and costs are significantly lower than using two laminators. Exchanging supply rolls is necessary only after they are completely consumed.

The laminator is suitable for various applications in which two different films must be applied. Light-sensitive films come in many types (positive film and negative film), many qualities (for example, relative to resolution capability), and various widths. There is also the possibility of laminating different color films on a support for aesthetic reasons. The lamination can be conducted cold or aided by heating.

In the latter case, it is recommended that the fixed roller be driven and the two pressure rollers be heated. In this instance, the drive and the heating functions are separated, simplifying construction. Furthermore, the heat supplied is through the film and can therefore be regulated to an optimum independently of the thickness of the support.

A preferred embodiment has a con, non shifting device with stop settings that engage one pressure roller in the operating position and the other pressure roller in the idle position, with an intermediate setting that lifts both rollers away from the fixed roller. This simplifies considerably constructing and servicing the laminator.

From a construction standpoint, it is recommended that both pressure rollers be supported in common side sections that can be pivoted around a fixed axis. The side sections are outside the laminating area and can also fulfill other functions.

In an example of a preferred embodiment, the shifting device has a pivot axis that can be rotated to a predetermined angle by means of a lever and that bears two eccentric disks, and the side sections have two supporting devices, opposite each other, engaging the eccentric disks. The lever enables, in a simple manner, bringing the two side sections, and hence the parts they bear, into one of the two operating positions or into an idle position.

It is advantageous for each supporting device to have a pretensioned spring operating between the eccentric disk and the side section. Thus, a predetermined pressure between the pressure rollers and the fixed roller is attained at the stop positions of the side sections. The preset tension is appropriately adjustable to achieve the desired laminating result.

It is further recommended that each side section engage a spring that counterbalances at least partially the weight of the side sections and the accompanying structural elements. This weight counterbalance creates in the lower pressure nip almost the same laminating conditions as in the upper pressure nip.

A common feed plate segment that can be adjusted in relation to the pressure rollers so that it aligns with each closed pressure nip is advantageous. This saves space and facilitates operation.

In particular, the common feed plate segment can be pivoted on a fixed axis of rotation and can be adjusted by a cam on the pivotable side sections.

In this connection, it is recommended that the pivot axis of the feed plate segment, its articulation, the pivot axis of the side sections, and the axis of the fixed roller be oriented one behind each other in the machine direction. This produces a simple, space-saving construction.

It is also advantageous to have a film clamping device on the exit side of each pressure nip. Unused film can be held thereby under tension in a position where it can be neither picked up by the driven, fixed roller nor subjected to excessively high temperature stress from the heated pressure roller.

It is also important to have a fixed cutting platform, with a cutting surface on its upper side, positioned on the exit side of each pressure nip. The operator can thus conveniently cut the film after the support has passed through the nip. This can minimize film waste.

A particularly desirable configuration for the structure of the clamping devices is to have the upper cutting platform pivotable and with a clamping segment that can be placed against a fixed upper clamping bar, and to have a lower clamping bar that is pivotable and can be placed against a clamping segment of the stationary lower cutting platform. The combination of a cutting platform and a film cutting device yields a compact construction with extremely low film waste.

The clamping segment or the clamping bar should have an elastic facing. This assures secure clamping even with different film thicknesses.

It is particularly advantageous for the shifting device to have a pivot axis that bears cams to pivot the upper cutting platform and levers to control the lower clamping bar. Thus, the clamping devices work automatically when the shifting device is actuated. The pivot axis can be the same that regulates the side sections through the eccentric disks.

A further refinement of the invention has an upper guide device and a lower guide device that are placed in series with the pressure nips in the film path. Each consists of two guide rollers, one being fixed and the other supported in the side sections. In the operating position, both guide rollers are together and assure reliable separation of the protective sheeting from the film. In the idle position, the guide rollers are separated from one another to avoid pressure marks and the like on the film.

It is very advantageous for both supply rollers to have a device to brake and tension the film. These devices enable, on one hand, controlled braking when the film is unwound and on the other hand, tensioning the film that is not required for lamination after the operating position is shifted. This effectively lifts the film from the fixed roller so that it can be driven in the direction of rotation without damaging the unneeded film.

In detail, the device for braking and tensioning can have a breaking element that engages the supply roller by friction and is loaded with a spring. Unwinding the film pivots the element by a specific angle and the spring returns it by the specific angle. Such a device can be incorporated without undue space requirement on the ends of the supply roller axis.

It is further recommended that control devices to release the roller drive be positioned in the side section pivot path and be operated by the side section in one of its stop positions. After the side section has reached the stop position at which the pressure nip is closed, the drive motor can be switched on automatically with the correct direction of rotation.

A sensing device is also very useful to detect the end of the incoming support and to turn off the roller drive accordingly after a time delay. The time delay is selected so that the drive motor is turned off automatically when the support has exited from the pressure nip and inertia has placed its back edge in the region of the associated cutting platform.

A fixed roller with a metal core and a nonstick coating offers special advantages. This nonstick coating ensures that very thin supports, for example, weighing 80 to 120 g/m$^2$, exit reliably from the pressure nip and are not picked up by the fixed roller.

The roller can have an elastic layer between the core and the nonstick coating. This enables bearing the support on a small surface area instead of on a line, thus facilitating uniform lamination by avoiding high surface pressures. The pressure rollers are advantageously provided similarly with an elastic layer.

It is advantageous for the diameter of the fixed roller to increase toward the ends. A slightly concave shape, necking down, for example, 0.03 to 0.05 mm, improves pressure uniformity over the roller length in the roller nip.

BRIEF DESCRIPTION OF THE DRAWINGS

The invention is explained in detail with the aid of an example of a preferred embodiment represented in the following Figures.

DESCRIPTION OF THE PREFERRED EMBODIMENT(S)

Figure 1:
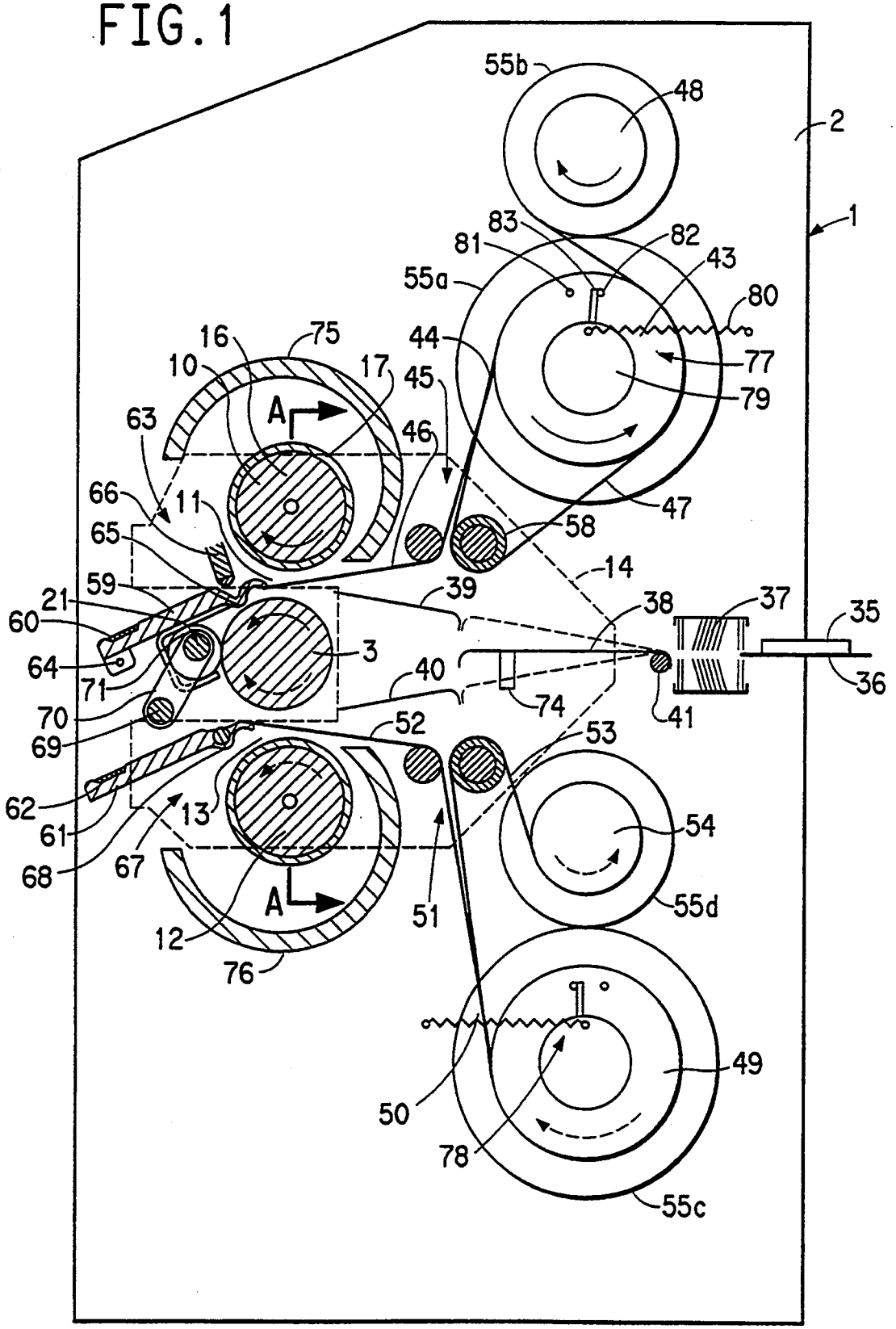
FIG. 1 is a schematic vertical section through a laminator of the invention.

Throughout the following detailed description, similar reference characters refer to similar elements in all Figures of the drawings.

Figure 2:
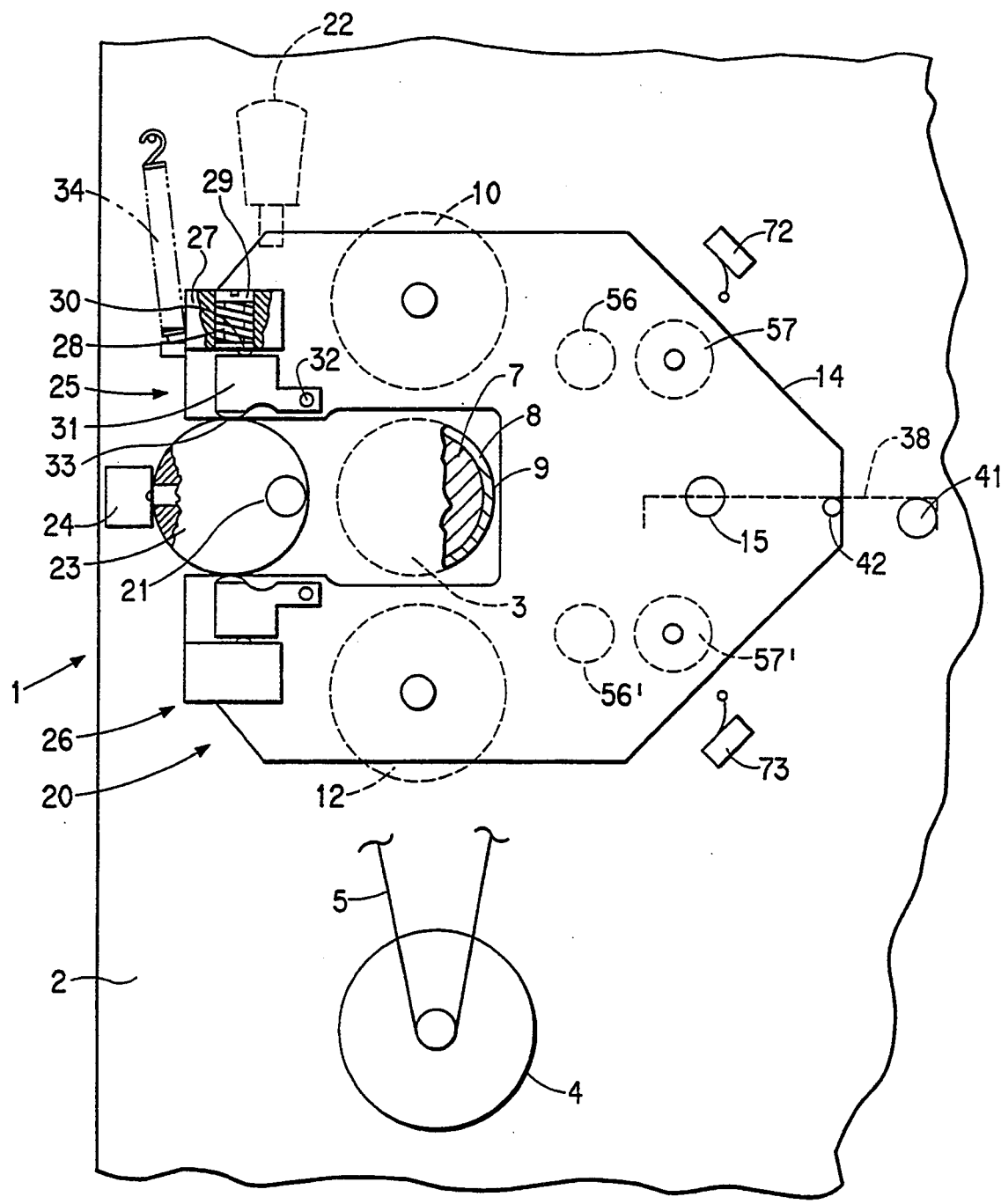
FIG. 2 is a schematic, enlarged external view of the laminator.
Figure 3:
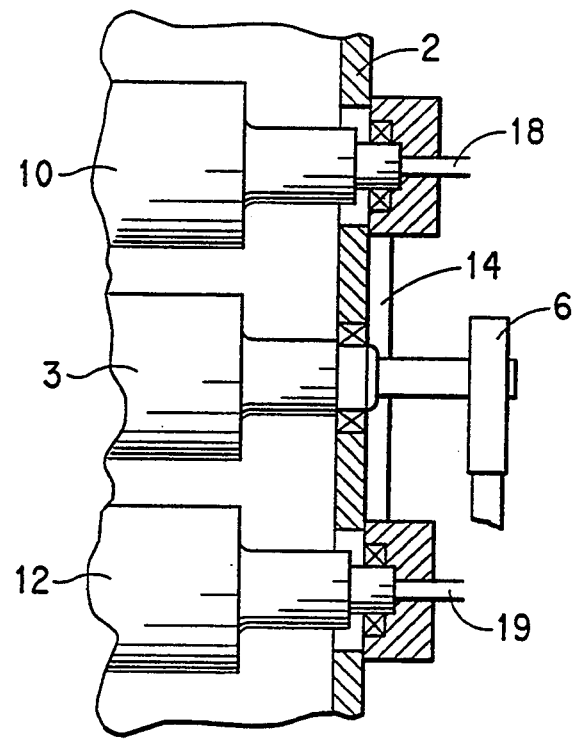
FIG. 3 is a partial cross-section along the A—A line in FIG. 1.

A machine frame 1 has two side walls 2, spaced apart, bearing a fixed roller 3. It can be driven by a motor 4 (FIG. 2) through a drive belt 5 and a pulley 6 (FIG. 3). The roller 3 has a metal core 7 of aluminum and/or steel on which is applied a nonstick coating 9 directly or over an intermediate elastic layer 8. In particular, this nonstick coating can be of polytetrafluoroethylene. This material is abrasion-resistant, easily cleanable, and when toughened, enables appropriate friction pick-up of the support. This coating can be applied as a shrinkable tube. It can be, for example, 0.3 mm thick. The optimum surface of the fixed roller 3 should narrow slightly toward the middle, a diameter reduction of 0.03 to 0.05 mm being desirable.

The fixed roller 3 forms an upper pressure nip 11 (FIG. 1) with an upper pressure roller 10 and a pressure nip 13 with a lower pressure roller 12. The two pressure rollers 11, 12 are mounted in side sections 14, which are located on both sides outside the side walls 2 and can be pivoted around an axis or shaft 15 (FIG. 2). The upper pressure nip 11 or the lower pressure nip 13 can be closed by pivoting the side sections 14 from the illustrated intermediate or middle setting. The pressure rollers 11, 12 have a metallic core 16. This is provided with an elastic layer 17, for example, of silicone rubber. In addition, the pressure rollers can be heated by a heat-transfer medium, as indicated by a feed line 18 and 19, respectively. See FIG. 3.

The side sections 14 are parts of a shifting device 20 (FIG. 2), which also has a pivot axis or shaft 21 that is rotatable toward both sides to a predetermined angle with the aid of an attached lever 22. Two circular eccentric disks 23 are attached on the pivot axis 21 in the area of the side sections 14. The eccentric disks 23 can be halted at three predetermined angle settings with the aid of click-stop devices 24, the click-stop devices 24 being illustrated for the intermediate setting. Two support devices 25 and 26 engage opposite sides of the eccentric disks 23 and are constructed as follows. A pretensioned spring 28 supported on an adjusting screw 29 is positioned in a housing 27 attached to the side section 14. The spring 28 acts through a plunger 30 on a lever 31 that can pivot around an axis or pin 32 on the side section 14 and contacts the eccentric disk 23 by means of a ball 33. This assures that, in the operation settings, the pressure rollers 10, 12 contact the fixed roller 3 with a force determined by the spring 28. In addition, two springs 34 extend between the machine frame 1 and the side sections 14. They counterbalance at least a part of the weight of the side sections 14 and their attached structural elements. Thus, the pressure ratio in the lower pressure nip 13 is similar to that in the upper pressure nip 11.

Sheet-shaped supports 35, consisting of paper, cardboard, synthetic resin, or the like, particularly very thin paper, are passed over a feed table 36 (FIG. 1) to an antistatic device 37 comprising two brush units. Each brush unit has metal or carbon fibers to eliminate static electricity and goat hairs or the like to brush away dirt particles. A feed plate segment 38 can be pivoted as desired from the illustrated intermediate position into the position indicated by the upper or lower broken lines in FIG. 1. In this manner, the support 35 is fed either over a feed plate 39 to the upper pressure nip 11 or over a lower feed plate 40 to the lower pressure nip 13. For this purpose, the feed plate segment 38 is pivotable around an axis or shaft 41 attached to the side walls 2. In addition, the feed plate segment 38 is supported on conical cams 42 on the side sections 14. In this manner, the feed plate segment 38 is pivotable around an axis 41 attached to the housing. Specifically, the feed plate segment 38 swivels upward when the upper pressure nip 11 is closed and downward when the lower pressure nip 13 is closed.

Referring to FIG. 1, a coated web 44 is unwound from an upper supply roller 43 mounted on the side walls 2 and is separated in the region of a guide device 45 into a film 46 and protective sheeting 47, which is collected on a windup roller 48. Similarly, there is a supply roller 49 for a lower coated web 50 that is separated in the region of a guide device 51 into a film 52 and protective sheeting 53 that is collected on a windup roller 54. The supply rollers 43 and 49 are rotated by the unwinding film. The windup rollers 48 and 54 are driven through a friction coupling with the friction wheels 55a, 55b and 55c, 55d. Each guide device 45, 51 comprises a guide roller 56 and 56' (FIG. 2) mounted on the side walls 2 and a second guide roller 57 and 57' (FIG. 2) mounted on the side sections 14 and is provided with an elastic layer 58 (FIG. 1). When the side sections 14 are pivoted, the guide roller 57 or 57' is pressed against the guide roller 56 or 56', respectively, in the operating guide device 45 or 51, respectively. This simplifies separating the film 46, 52 from the protective sheeting 47, 53 without causing an undesirable pressure mark during the idle time.

A cutting platform 59 with a cutting surface 60 on its top side is provided at the exit of the upper pressure nip 11. A cutting platform 61 with an upper cutting surface 62 is positioned after the lower pressure nip 13. The upper cutting platform 59 is part of a film clamping device 63. For this purpose, it is pivotable around a fixed axis or shaft 64 and can be placed with a clamping segment 65 against a fixed upper clamping bar 66. The lower cutting platform 61 is pivotable and has a clamping segment 68 that can be placed against the fixed clamping bar 69 to form a film-clamping device 67. The clamping bar 69 is attached to two levers 70 that are borne by the pivot axis 21. Also located on this pivot axis 21 are eccentric disks 71 that swivel the cutting platform 59 by means of a U-shaped cam. The clamping bar 66 and the clamping bar 69 each have an elastic facing.

Referring to FIG. 2, two switches 72 and 73 located in the pivot path of a side section 14 are actuated when the side section 14 reaches each end position. Actuating the switch 72,73 sets the correct direction of rotation for the motor 4, which can then be turned on by a foot switch, not shown. A sensor 74 (FIG. 1) on the feed plate segment 38, particularly a photoelectric sensor, determines when the back edge of the support 35 has passed and switches off motor 4 after a preset time delay. This time delay is set so that the support 35 stops with its back edge on the cutting surface 60 or 62.

Heat shields 75 and 76 protect the internal mechanism and the film supply rolls 43, 49 from heat radiation by the pressure rollers 10 and 12.

FIG. 1 illustrates schematically a braking and tensioning device 77 for the supply roller 43 and a braking and tensioning device 78 for the supply roller 49. The device 77 has a disk-shaped braking element 79 that interacts with the supply roller 43 by frictional contact. The braking element 79 responds to a spring 80 and is pivotable to a limited angle between two fixed stops 81 and 82, between which is located a stop 83 that moves with the braking element 79. If a film 46 is unwound from the supply roller 43, the braking element 79 pivots until it is against stop 81. If the pressure nip 11 is opened, the action of the spring 80 returns the braking element 79 to the idle position illustrated, simultaneously tensioning and lifting the film 46 from the fixed roller 3. The braking and tensioning device 78 is constructed similarly.

Figure 4:
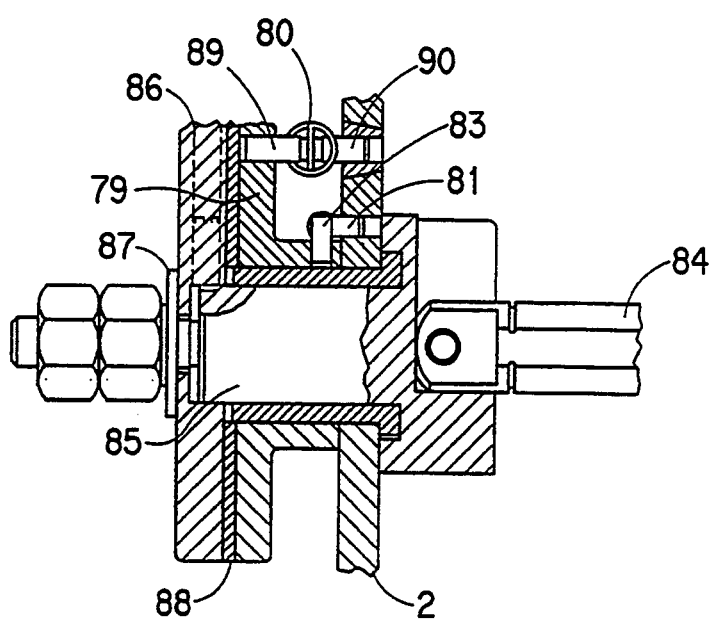
FIG. 4 is a section through the braking and tensioning device.

The construction design of such a device 77, 78 is illustrated in FIG. 4. The axis or shaft 84 of the supply roller is linked through a coupling with a hub 85 that has a pressure disk 86 on the outer side. This is compressed by an adjustable disk spring 87 against the friction lining 88 of the disk-shaped braking element 79. This element 79 is pivotable to a limited angle around the hub 85. The spring 80 engages a pin 89 and is attached at its other end to a pin 90 set in the side wall 2.

The drawings show the intermediate position in which both pressure nips 11, 13 are open. If a lamination is to be conducted in the upper pressure nip 11, the lever 22 is rotated counterclockwise in FIG. 2, which pivots the side sections 14 counterclockwise, until the upper pressure roller 10 comes into contact with the fixed roller 3 and the upper pressure nip 11 is closed. The guide rollers 56 and 57 are simultaneously pressed together. The rotation of the eccentric disk 71 lowers the upper cutting platform 59 and thereby, the clamping device 63 is opened wider. In addition, the feed plate segment 38 is pivoted into its upper position. Finally, the release switch 72 is actuated. All of these actions depend only on the actuation of the lever 22. The motor 4 is started by pressing a foot switch. A support 35 is fed through the antistatic device 37 over the feed plate 39 to the pressure nip 11, in which the film 46 is laminated.

Now, the coated film is unwound from the supply roll 43 and the protective sheeting 47 is taken by the windup roll 48. When the back edge of the support 35 reaches the sensor 74, the latter emits a signal that actuates the shutoff switch of the motor 4 after a specific time. The back edge is now in the area of the cutting surface 60, so that the operator can conveniently cut the film 46. All rotary motions of this laminating step are indicated by extended arrows in FIG. 1.

Lowering the side sections 14 also closes the clamping device 67 and clamps the lower film 52. Simultaneously, the lower pressure roller 12 and the lower guide roller 57' are lowered. This removes tension from the film 52 and protective sheeting 53 and therefore also from the coated web 50. The associated spring is therefore able to rotate the braking element of the braking and tensioning device 78 opposite to the unwind direction and thus to tension the film 52. It thereby disengages from the fixed roller 3. If this fixed roller 3, in the instance of an operating upper pressure nip 11, rotates counterclockwise, there is no risk that the lower film 52 will be picked up by the roller surface and the tension will exceed the holding force of the clamping device 67.

If lever 22 is now pivoted in the opposite direction, the laminator can be put back into the intermediate setting, as illustrated in FIGS. 1 and 2. If the lever 22 is rotated further, the lower pressure nip 13 closes. The feed plate segment 38 is simultaneously pivoted downward. The guide rollers 56' and 57' of the guide device 51 are pressed together. Finally, the switch 73 is actuated. Now, a support 35 can be passed over the feed plate segment 38 to the lower pressure nip 13, where it is laminated on its under side with a film 52, while the protective sheeting 53 is collected on the windup roll 54. The sensor 74 responds again to the back edge of the support 35, so that the support stops after a time delay in the area of the cutting surface 62, such as closing the clamping device 63 and tensioning the upper film with the aid of the braking and tensioning device 77 correspond to the operating sequence described previously.

The film 46 is a light-sensitive film and the film 52 is a protective film. To produce a four-color print, the support 35 can be laminated successively with four light-sensitive films that have been colored with one of the printing colors. In a final pass, a protective film is placed over these four light-sensitive films.

Suitable light-sensitive films are all such films that lose their tackiness on exposure to nonactinic radiation, for example, by photopolymerization or photocrosslinking. Such films are used, for example, in the processes for preparing multicolor proof prints according to U.S. Pat. No. 4,356,253 and EP 0 243 933. However, light-sensitive films that become tacky on exposure to actinic radiation, such as, for example, described in U.S. Pat. No. 4,243,741 and U.S. Pat. No. 4,346,162, are also suitable for preparing multicolor proof prints with the laminator of the invention. Protective films that can be used are, for example, the films described in European Patent Application A-0 285 039, which prevent a troublesome, glossy surface.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A laminator for laminating a film onto a support, with an upper pressure nip formed between a fixed roller and an upper pressure roller to which can be passed the support over a feed plate and a film from an upper supply roll after removal of a protective sheeting, whereby the upper pressure roller is adjustable back and forth by means of a shifting device from an idle position, in which the upper pressure nip is open into an operating position in which the upper pressure nip is closed and a roller drive is switched on, characterized in that the fixed roller forms with a lower pressure roller a lower pressure nip to which can be passed, alternatively to the upper pressure nip, the support over a feed plate and a second film from a lower supply roll after removal of a protective cover sheeting, and in that the lower pressure roller is adjustable back and forth by means of the shifting device from an idle position in which the lower pressure nip is open into an operating position in which the lower pressure nip is closed and the roller drive is switched on in the opposite direction.

2. The laminator in accordance with claim 1, characterized in that the fixed roller is driven, and the two pressure rollers can be heated.

3. The laminator in accordance with claim 1, characterized by the shifting device having stop settings such that when one of the pressure rollers assumes the operating position, the other pressure roller assumes the idle position, the shifting device further having an intermediate setting that lifts both of the pressure rollers away from the fixed roller.

4. The laminator in accordance with claim 3, characterized in that the two pressure rollers are mounted in common side sections that can be pivoted around a fixed axis.

5. The laminator in accordance with claim 4, characterized in that the shifting device has a pivot axis that is rotatable by a predetermined angle by means of a lever and bears two eccentric disks, and that the side sections have two support devices engaging opposite sides of the eccentric disks.

6. The laminator in accordance with claim 5, characterized in that each support device has a pretensioned spring that acts between the eccentric disk and the side section.

7. The laminator in accordance with claim 4, characterized in that the side sections are each acted upon by a spring that counterbalances at least partially the weight of the side section and attached construction elements.

8. The laminator in accordance with claim 1, characterized by a common feed plate segment that is adjustable with the pressure rollers so that it points to the respective closed pressure nip.

9. The laminator in accordance with claim 4, characterized by a common feed plate segment that is adjustable with the pressure rollers so that it points to the respective closed pressure nip, and characterized in that the con, non feed plate segment can be pivoted around a fixed pivot axis and is adjustable by a cam from the pivotable side sections.

10. The laminator in accordance with claim 9, characterized in that the pivot axis of the feed plate segment, its joint, the pivot axis of the side sections and the axis of the fixed roller are positioned one behind the other.

11. The laminator in accordance with claim 1, characterized in that a film clamping device is mounted on an exit side of each pressure nip.

12. The laminator in accordance with claim 11, characterized in that a cutting platform with a cutting surface on a top side is mounted at an exit of each pressure nip.

13. The laminator in accordance with claim 12, characterized in that the clamping devices are formed by having an upper one of the cutting platforms pivotable and with a clamping segment that can be placed against a fixed upper clamping bar and by having a lower clamping bar that is pivotable and can be placed against a clamping segment of a stationary lower one of the cutting platforms.

14. The laminator in accordance with claim 13, characterized in that the clamping segment and the clamping bar have an elastic facing.

15. The laminator in accordance with claim 13, characterized in that the shifting device has a pivot axis, bearing cams to pivot the upper cutting platform and levers to hold the lower clamping bar.

16. The laminator in accordance with claim 4, characterized by an upper guide device and a lower guide device in the path of the films to the pressure nips, each guide device consisting of two guide rollers, one being fixed and the other mounted on the side sections.

17. The laminator in accordance with claim 1, characterized in that both supply rolls are each equipped with a device to brake and tension the film.

18. The laminator in accordance with claim 17, characterized in that each one of the devices to brake and tension has a braking element that engages one of the supply rolls by friction contact, is loaded with a spring, can be pivoted by a limited angle when the respective film is unwound, and can be pivoted back by the spring by a limited angle.

19. The laminator in accordance with claim 4, characterized in that switches to release the roller drive are mounted in the pivot path of the side sections and can be actuated by the side sections in each of their end positions.

20. The laminator in accordance with claim 1, characterized by a sensing device that detects the end of the incoming support and as a function thereof switches off the roller drive after a time delay.

21. The laminator in accordance with claim 1, characterized in that the fixed roller has a metal core provided with a nonstick layer.

22. The laminator in accordance with claim 21, characterized in that an elastic layer is provided between the metal core and the nonstick layer.

23. The laminator in accordance with claim 21, characterized in that diameter of the fixed roller increases toward its ends.

* * * * *